Figure 4:
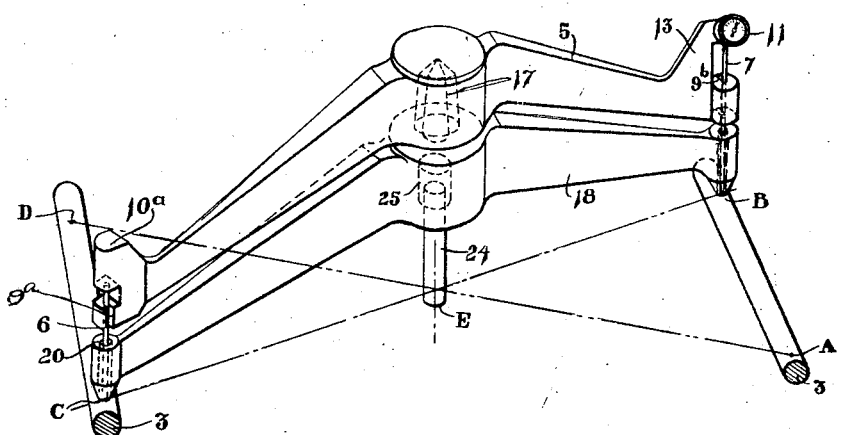

Oct. 27, 1925.
W. ECCLES
1,559,230
ALIGNING METER FOR LAND AND MARINE GEARS AND SHAFTS
Filed Jan. 22, 1921    5 Sheets-Sheet 1
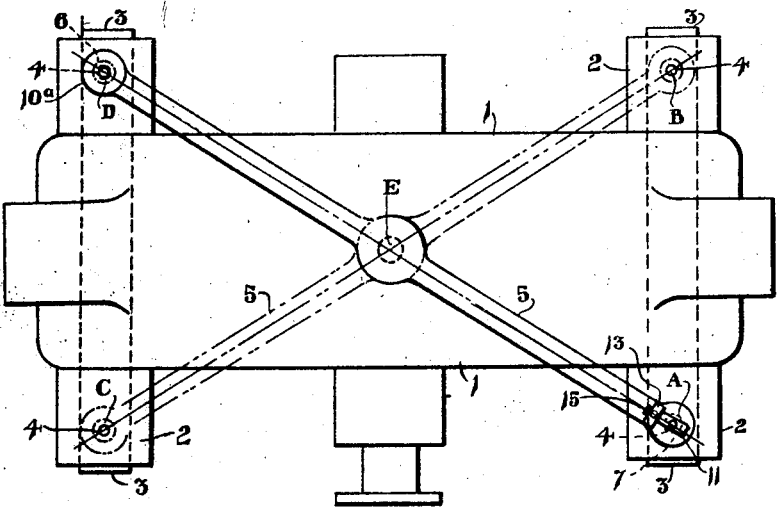
Fig. 1.
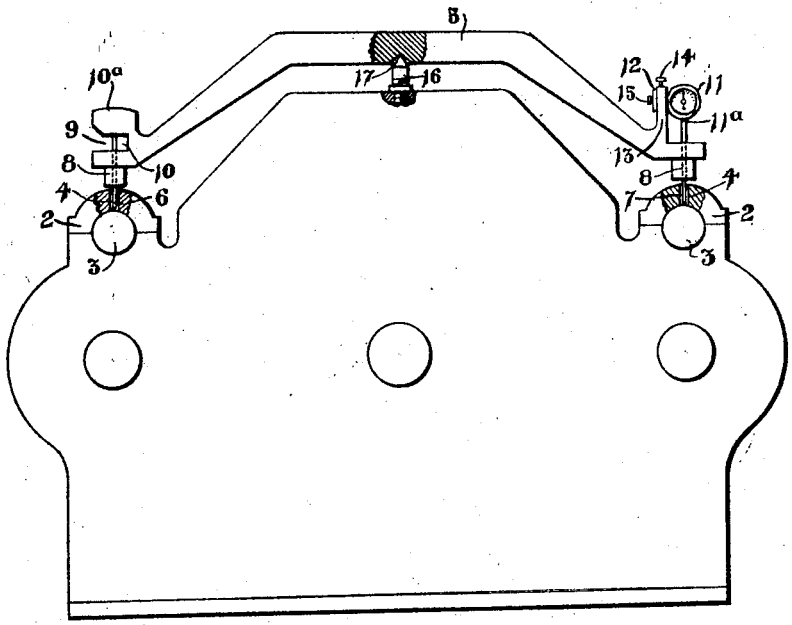
Fig. 2.
William Eccles
INVENTOR
BY
ATTORNEY Oct. 27, 1925.  
W. ECCLES  
1,559,230  
ALIGNING METER FOR LAND AND MARINE GEARS AND SHAFTS  
Filed Jan. 22, 1921  
5 Sheets-Sheet 3

William Eccles
INVENTOR

Oct. 27, 1925.　　　　　　　　　　　　　　　　　1,559,230
W. ECCLES
ALIGNING METER FOR LAND AND MARINE GEARS AND SHAFTS
Filed Jan. 22, 1921　　　5 Sheets-Sheet 4
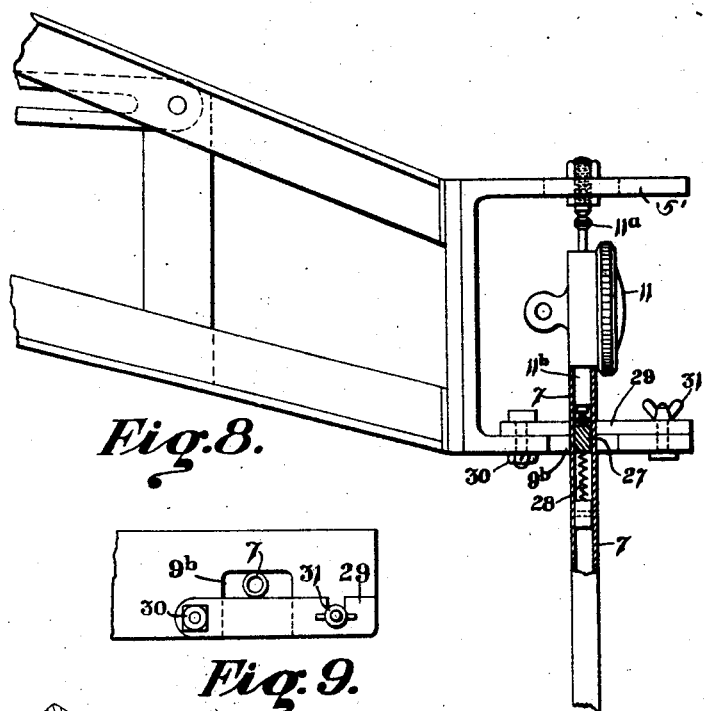
Fig. 8.
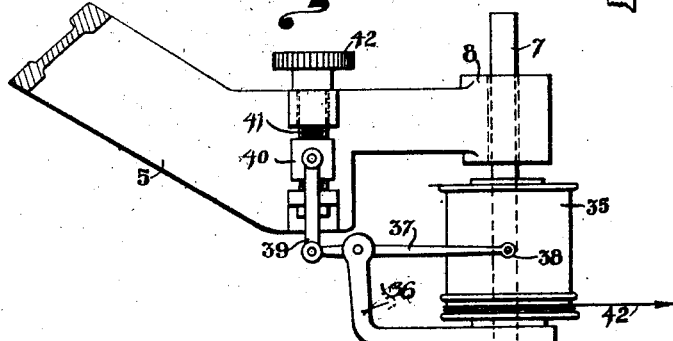
Fig. 9.
Fig. 10.
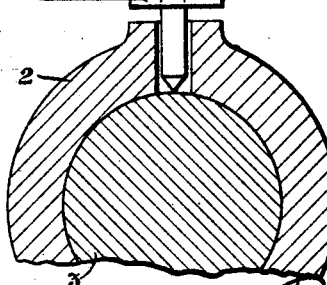
William Eccles
INVENTOR
BY
ATTORNEY Oct. 27, 1925.
W. ECCLES
1,559,230
ALIGNING METER FOR LAND AND MARINE GEARS AND SHAFTS
Filed Jan. 22, 1921    5 Sheets-Sheet 5

William Eccles
INVENTOR
BY J.C. Davis
ATTORNEY

Patented Oct. 27, 1925.

1,559,230

UNITED STATES PATENT OFFICE.

WILLIAM ECCLES, OF CHORLTONCUM-HARDY, ENGLAND, ASSIGNOR, BY MESNE ASSIGNMENTS, TO WESTINGHOUSE ELECTRIC AND MANUFACTURING COMPANY, A CORPORATION OF PENNSYLVANIA.

ALIGNING METER FOR LAND AND MARINE GEARS AND SHAFTS.

Application filed January 22, 1921. Serial No. 439,117.

*To all whom it may concern:*

Be it known that I, WILLIAM ECCLES, a subject of the King of Great Britain, and a resident of Chorltoncum-Hardy, in the county of Lancaster, England, have invented a new and useful Improvement in Aligning Meters for Land and Marine Gears and Shafts, of which the following is a specification.

This invention relates to devices for indicating or registering the coplanar condition of two or more shafts.

Two shafts are truly parallel only when the following conditions are fulfilled; first, the distances between the shafts measured at two places are equal, and, second, the shafts are co-planar, that is, their axes lie in the same plane. The fulfilment or otherwise of the first of these conditions can readily be ascertained by direct measurement and the present invention has for its object to provide an improved instrument by means of which when the first condition is present the fulfilment or otherwise of the second condition and consequently the parallelism or lack of parallelism of the shafts may be ascertained. The instrument may also be arranged to indicate the amount by which the shafts have deviated from the parallel position and, under operating conditions, may be employed to record the times at which divergence occurs as well as the amount of such deviation at those times.

The instrument may also be used under certain conditions to indicate the co-planar condition or otherwise of two shafts which are not parallel.

In connection with toothed gear it is necessary for satisfactory operation that not only the pinions and wheels should be true with properly shaped teeth but that the driving and driven shafts of such gear should be at all times in one and the same plane. If this condition is not maintained wear of the gears and a diminution in the efficiency will inevitably follow.

It is an object of the present invention to provide an instrument of the kind mentioned which shall be particularly suitable for use in connection with the shafts of reduction gears for turbines such as are now commonly employed both in land and in marine work.

According to the invention the instrument comprises in its simplest form a beam or rod of a shape which will give it the necessary mechanical stiffness provided with three bearing or support points one of which at least is arranged to be adjustable. The beam is of such form and dimensions that two of the bearing points can be brought into engagement with the shafts, the co-planar condition of which is to be ascertained or indicated, when the line joining these points is inclined to the axes of the shafts. The instrument is first applied to the shafts in such a manner that two of the support points make contact with the surfaces of the two shafts while the third bearing point is supported at a fixed point which may be a part of the frame or shaft-supporting structure and if necessary the adjustable support point or points of the beam is or are adjusted for this purpose. The instrument is then turned or rotated round the fixed bearing point to another position in which the bearing or support points will engage wth the shafts, then if this requires no adjustment of the support point or points the shafts are in the same plane. If, on the other hand, adjustment of the support point or points is required before engagement with the shafts takes place, the shafts are not truly co-planar and the bearings or the frame can then be adjusted until the required condition is obtained. It will be clear that the first application of the instrument to the shafts is for the purpose of obtaining a zero or datum mark and the second application will show by the amount of variation or adjustment of the support point or points which is required from such zero or datum mark by how much the shafts deviate from the desired co-planar condition.

In order to avoid the necessity of supporting what has been termed the fixed bearing or support point of the instrument on the frame or structure which may move relatively to the shafts in question due to distortion of the frame or structure or to alteration of the position of the journals in the bearing, the instrument itself may be arranged to provide such a fixed bearing support which will be definitely located relatively only to the shafts, by constructing it with two beams, one of which, conveniently called the "supporting beam," is provided with two bearing points and is applied to the shafts to be tested. This beam has formed on it a suitable bearing or support constituting the fixed point of the second beam, which may conveniently be termed the "indicating beam" and which has three bearing or support points. In using this form of the instrument the position of the supporting beam is not altered, being determined by two points on the shafts, and the actual test is made by using the indicating beam in the manner first described.

Figure 5:
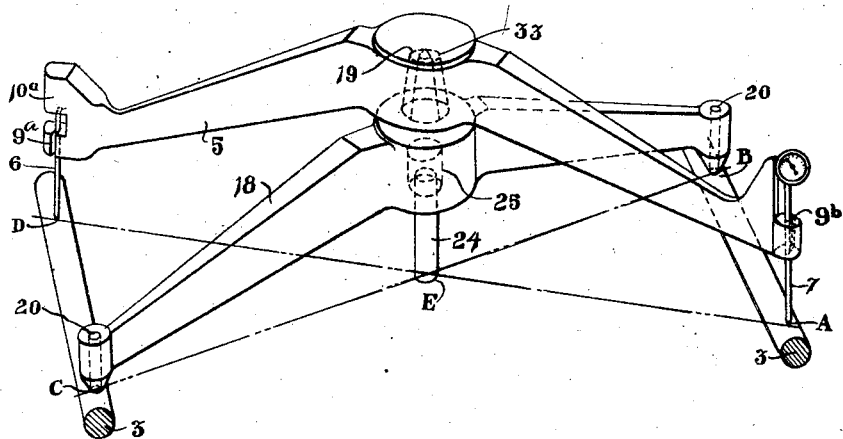
Figure 3:
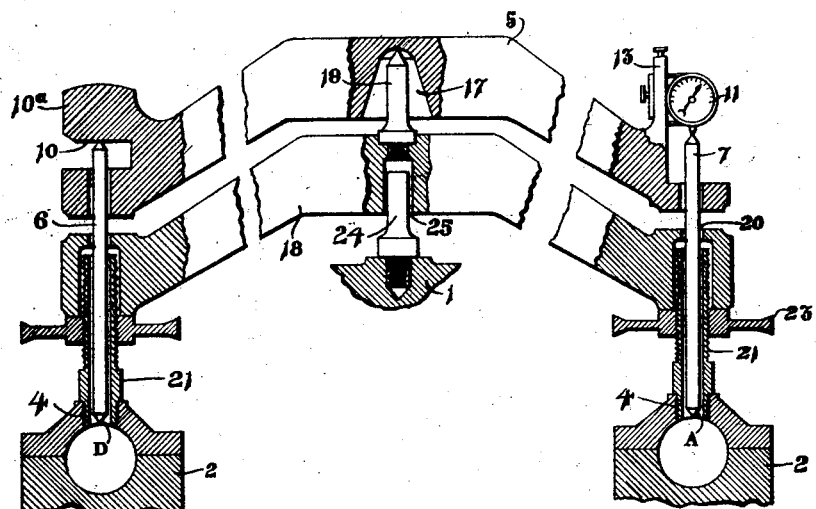
Figure 11:
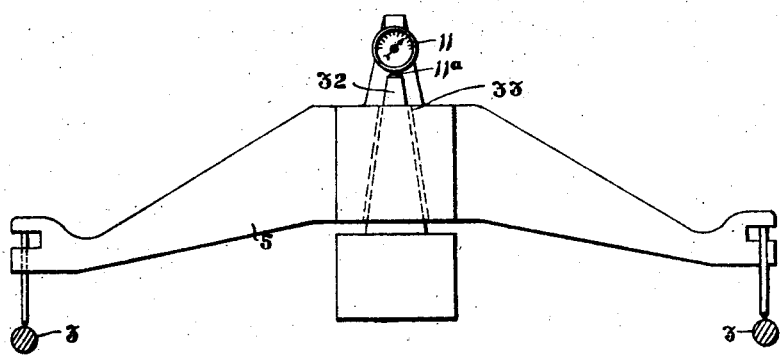

To enable the invention to be more clearly understood it will now be described with reference to the accompanying drawings in which Fig. 1 is a plan view of a turbine gear casing the co-planar condition of two parallel shafts of which it is desired to investigate. This figure also illustrates the application of one form of instrument according to the invention and the method of making the investigation. Fig. 2 is an end elevation, partly in section, of Fig. 1. Fig. 3 is a sectional elevation of a modified form of the instrument, and Figs. 4 and 5 are somewhat diagrammatic perspective views illustrating the method of using this modified form of the instrument. Figs. 6 to 9 are views of modified details. Fig. 10 is an illustration of a convenient recording device applied to the indicating beam. Fig. 11 is an end elevation showing a further modified form of my invention. Like reference numerals have been used where possible to indicate similar parts in the various figures.

Referring first to Figs. 1 and 2 of the drawings, 1 represents the casing of a turbine transmission or reduction gear and 2 are portions of the bearing caps or casings of two parallel shafts 3, 3, the co-planar condition of which is to be investigated. As hereinbefore stated, the distance apart of the shafts 3 may be determined by direct measurement, and assuming for the purpose of the description of the invention that the shafts have been found to have their axes equi-distant at two like points, the centres of their ends for example, it is necessary, for the condition of parallelism, to determine whether four points, two similar points on the axis of each shaft, are in the same plane. Assuming also for the moment that the shafts 3 are of equal diameter it is possible to select four points such A B C D on the upper surfaces of the shafts vertically over their axes, which points are or should be in the same plane. Access to these points may be had through holes 4, such as may be provided for lubrication purposes, in the casings 2 and the bearings, or holes may be specially made for the purpose.

The form of the instrument shown in Figs. 1 and 2 for carrying out the determination of the co-planar condition of the points A B C D comprises essentially an indicating beam 5 which is made arch-shape as shown in order that its central portion may clear the intermediate portion of the casing between the shafts 3, 3 and is sufficiently stiff or rigid to prevent bending or distortion thereof when in use. The beam may be of solid or pressed metal, but is advantageously of built-up girder construction to combine lightness with strength. For large beams, a strong and light material such as that known as duralumin is preferably employed. Each end of the beam is provided with a bearing point or feeler for the points A B C D and such feelers advantageously comprise conical ended pins 6 and 7 of standard length and made of a hard material such as steel or duralumin. The pins or feelers 6 and 7 are arranged to be inserted in the holes 4 so as to make contact with the surface of the shafts 3, 3 at the diagonally opposite pair of points A and D or B and C, and the beam 5 is provided at its ends with holes 8 to receive the pins 6 and 7. The left-hand end of the beam as shown in Fig. 2 is formed with a horizontal slot 9 against the upper surface 10 of which the upper end of the pin 6 is adapted to bear for the purpose of accurately locating this end of the beam 5 with respect to the top of the pin 6 and therefore with respect to one of the points A, B, C or D on the shaft 3, 3. At the right-hand end of the beam 5 in place of a limiting surface such as 10, there is provided an indicating device for showing the relationship of the position of the pin 7 with respect to the beam 5. The indicating device advantageously comprises a dial micrometer 11 mounted on a vertical slide 12 carried by an arm 13 on the end of the beam. Instead of a dial micrometer any mechanical, electrical, or even acoustic multiplying means may be employed. In practice, however, a dial micrometer has been found the most convenient for ordinary purposes. Adjustment of the slide 12 is permitted by means of a fine adjusting screw 14 and a screw 15 is provided for clamping the micrometer 11 in adjusted position. The micrometer actuating plunger 11$^a$ is arranged to be engaged by the upper end of the pin 7.

As hereinbefore explained, the beam 5 is designed to be used diagonally in two positions, that is, from A to D and from B to C, and the third or relatively fixed bearing point is arranged where the diagonals intersect at E. This bearing point E may be constituted by an adjustable conical pivot pin 16 for engaging in a conical recess 17 at the centre of the underside of the beam, the said pin 16 being attached on part of the gear casing 1.

In using the instrument, it is first applied to the shafts 3 in such a manner that the pins 6 and 7 contact with points A and D for example on the shafts, whilst the centre of the beam rests on the conical pin 16. The pin 6 at the left-hand end of the beam and the pin 16 now constitute fixed bearing points and for convenience of manipulation the left-hand end of the beam is preferably provided with an over-balance weight $10^a$, or equivalent means, tending to maintain the surface 10 in contact with the pin 6. To finally set the instrument in its first position, the micrometer 11 is adjusted on its support 13 until its reading is zero when its actuating plunger $11^a$ is in contact with the pin 7, the pin 6 already being in contact with the shaft and surface 10. The micrometer in then clamped by means of the screw 15 and the instrument is turned or rotated about the centre fixed bearing point 16 to the other diagonal position in which the pins 6 and 7 contact with the points B and C on the shafts 3. In the new position of the beam, the pin 16 and the pin 6 which is again in contact with the surface 10, support the beam so that it will be readily understood that any deviation of the point of the shaft beneath the pin 7 at the other end of the beam will be immediately indicated by the dial micrometer 11 and the indication will serve as a guide for wedging up the gear case or otherwise re-aligning the shafts.

Thus, it will be seen that in the use of this device a plane is determined by the fixed central supporting point and by an element of one shaft, and that means are then provided for determining the relative distances from said plane to two selected points lying in an element of the other shaft.

The above described construction of the instrument is suitable for testing the coplanar condition of the shafts for example when setting up turbine gear in the factory, but on ships and in other places where the gears are in operation it is not always feasible to provide a suitable fixed bearing point owing to distortion of the casing and to alteration of the position of the journals in the bearing, and to overcome this difficulty the modified form of instrument described principally with reference to Figs. 3 to 5 has been devised.

The modification is similar in principle to the arrangement already described, but in place of the central bearing point on the casing 1, there is provided an auxiliary beam 18, hereinafter referred to as the support beam, adapted to be borne by the shafts or by parts of the casing or framework adjacent thereto and having at the centre of its upper side a conical pin 19 which is received in the recess 17 in the beam 5 in substitution for the pin 16. The pin 19 although normally fixed may be provided with means for initially adjusting its position in the vertical direction. The ends of the beam 18 are shown in Figs. 4 and 5 as provided with bearing points with holes 20 through which the pins 6 and 7 can pass. As in practice, however, it is not desirable for the beam ends to bear directly on the shafts, the beam is preferably supported or carried as shown in Fig. 3 by means of tubes or standards 21 designed to fit in or over the holes 4 in the casing 2 or bearings of the shafts. Each tube or standard 21 may be arranged to fit into an enlargement of the hole 20 and one or both of them are formed with a screw-threaded portion carrying an adjusting nut 23 which may be rotated by hand to obtain an initial setting of the beam 18. For this purpose a set of pins is employed similar to those already described in connection with Figs. 1 and 2, which pins are adapted to be inserted through the holes 20 to make contact with the shafts. The adjusting nuts 23 are then turned until the upper ends of the pins are flush with the top surfaces of the ends of the beam 18.

The intermediate bearing point 19 on the support beam 18 is thus accurately located with respect to two points A, D on the shafts 3, 3, so that its position is independent of and unaffected by distortion of the gear casing 1. This initial adjustment having been attained, the beam 5 is placed above the beam 18 so as to be supported on the pin 19 and two pins 6 and 7 of suitable length are then employed in exactly the same manner as with the construction first described, that is to say, at the left-hand end of the beam 5 the pin 6 is caused, by reason of the overbalance weight $10^a$, to contact with the shaft and with the surface 10, whereby two of the bearing points become fixed, whereupon the dial micrometer 11 is adjusted on the support 13 until the reading is zero. The beam 5 is now turned round the pivot 19, the pins 6 and 7 being inserted as before in connection with the other two bearing points, any deviation from the co-planar condition being immediately indicated by the micrometer 11.

A pin 24 may advantageously be provided on the gear casing 1 to engage in a recess 25 in the underside of the beam 18 to serve as a guide for the latter. It will be understood however that the pin 24 in no way serves as a pivot or support and its provision is not essential.

The diagrammatic perspective views, Figs. 4 and 5, will render the method of using the instrument clear. In these figures $9^a$ and $9^b$ indicate slots cut in the ends of the beam 5 to enable the latter to be swung round from its first position to its second position and to permit the removal of the length gauges 6 and 7 without lifting the beam.

The method of using the instrument has been described in connection with shafts when there is little or no load on the gearing. When however the gear is running under load, in view of the fact that the whole casing 1 may become distorted and as there is always a small clearance in the bearings, permitting the shaft journals to rise or fall in their bearings, the zero setting obtained as above described would be affected and a false indication of the condition of the shafts produced. A fresh zero setting should therefore be obtained when the shafts are running, it being only necessary for this purpose to readjust the support beam by means of the nuts 23. In this way the pivot support 19 is brought back to the same position relatively to the two bearing points A, D on the shaft as before, and the zero setting is regained whilst the indicating beam remains in its second or indicating position.

It has been above assumed that the diameters of the shafts 3 are identical and in any case it will be necessary that their diameters shall have been determined before conducting a test, and if there is any difference in the measurements due allowance should be made. In cases where the shafts are not of the same but are of known diameter, it is merely necessary to employ a different set of standard pins 6 and 7, the lengths of which have been calibrated to correspond with the difference in the diameters of the shafts.

In cases where it is desired to determine the co-planar condition of two shafts which are not parallel, it will be understood that the investigation is carried out in a similar manner. The two arms of the beam or beams, however, will be of unequal length, that is to say, the horizontal distances A E and C E will be unequal to E D and B E. It will also be understood that when there are more than two shafts, the co-planar condition of the shafts may be investigated two at a time and so the condition of all of them determined.

Figure 7:
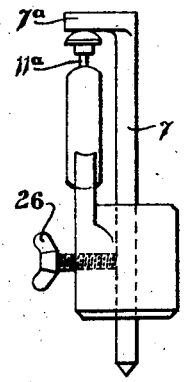
Figure 6:
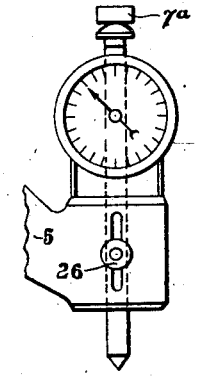

In the modified arrangement of the micrometer 11 shown in Figs. 6 and 7, instead of the pin 7 contacting with the micrometer actuating plunger from below, the pin 7 may be extended upwards and provided with an arm 7$^a$ arranged to engage the plunger 11$^a$ which in this construction is at the top of the instrument. The micrometer may be adjustably attached to the beam 5 in any suitable manner, and a screw 26 may be provided for clamping the gauge 7 in the arm of the beam.

According to a further modification, the dial micrometer 11 may be carried upon the upper end of the pin 7 with its actuating plunger 11$^a$ designed to engage beneath a surface 5' on the right-hand end of the beam as seen in Fig. 8 which is a sectional view showing the right-hand end of the support and indicator beams constructed in girder formation. The pin 7 at its upper end is tubular and designed to receive the fixed stem 11$^b$ of the micrometer 11 and a plunger 27 and light spring 28 are provided for the purpose of supporting the weight of the indicator and plunger. The pin 7 and micrometer 11 are placed in position through the slot 9$^b$ in the right-hand end of the beam 5. As shown in Figs. 8 and 9, a latch device 29 may be pivoted to the beam at 30 and provided with a fastening indicated at 31 for the purpose of retaining the pin 7 carrying the micrometer 11 within the hole 8 after being inserted into position through the slot 9$^b$ and for permitting their removal.

In a further modification the adjustable bearing point of the beam may be at the centre instead of at one end. This arrangement is shown in Fig. 11. The micrometer 11 is rigidly but adjustably mounted on the beam 5 at the centre thereof and its actuating rod 11$^a$ is designed to be engaged by an elongation 32 of the pin 19 extending through a hole 33 in the centre of the beam. With this arrangement, however, the reading of the micrometer is only half of the amount shown when the micrometer is at the end of the beam.

When it is desired permanently to record the coplanar condition of the shafts when in motion and the amount of deviation therefrom, the dial micrometer may be replaced or supplemented by any suitable form of recording device having, for example a strip of paper on a drum actuated by one of the shafts or by clockwork or otherwise to move the paper in relation to a pencil or stylus operated by or through the pin 7. A suitable form of recording device which may conveniently be used is illustrated in Fig. 10 in which 35 represents a drum rotatably mounted upon the pin 7, but incapable of moving longitudinally thereon, and carrying a lateral arm 36 serving as the fulcrum for a multiplying lever 37. The lever 37 carries at the end of its long arm a pencil or stylus 38 arranged to contact with a cylinder or a strip of record paper on or passing round the drum 35, whilst the short arm of the lever 37 is connected to the beam 5 through the intermediary of a link 39 constituting a parallel motion. The link 39 is connected to a slide 40 capable of being moved in relation to the beam 5, for the purpose of adjustment of the stylus 38, by means of a fine screw 41 having a milled head 42. The upper end of the pin 7 is arranged to move in a hole 8 in the end of the beam 5, the said hole constituting a guide. The drum 35 may be revolved by any suitable means, such as clockwork, or it may be directly driven from one of the shafts of the gear as by means of a cord 42 connected to suitable reduction gearing. With such an arrangement it is possible to obtain an indication record of the wear or twisting of the shafts or the distortion of the gear casing at different times or loads or speeds and such records may serve as a warning as to the safe limit of the power.

Having now particularly described and ascertained the nature of my said invention and in what manner the same is to be performed, I declare that what I claim is:—

1. An instrument for indicating the deviation from a coplanar condition of two substantially parallel shafts, comprising a beam provided with three bearing or support points, one of which is arranged to abut against a fixed point adjacent the shafts under test whilst two are arranged to respectively engage said shafts at points on lines inclined to the axes of said shafts, at least one of said bearing or support points being adjustable.

2. An instrument for indicating the deviation from a coplanar condition of two substantially parallel shafts as claimed in claim 1, wherein two of the bearing or support points are constituted by feelers or pins arranged to make contact with the shafts and with the beam or rod, one of said feelers or pins being adjustable with respect to the beam or rod.

3. An instrument for indicating the deviation from a coplanar condition of two substantially parallel shafts comprising a beam member having three bearing or support points, one of which is arranged to abut against a fixed point adjacent the shafts under test whilst two are arranged to respectively engage said shafts at points on lines inclined to the axes of said shafts, two of said bearing or support points being constituted by feelers or pins arranged to make contact with the shafts and with the beam or rod and one of said feelers or pins being adjustable with respect to the beam or rod, and a multiplying mechanism for indicating the position of said adjustable feelers or pins relative to the beam or rod.

4. An instrument for indicating the deviation from a coplanar condition of two substantially parallel shafts, comprising a beam member having three bearing or support points, one of which is arranged to abut against a fixed point adjacent the shafts under test whilst two are arranged to respectively engage said shafts at points on lines inclined to the axes of said shafts, two of said bearing or support points being constituted by feelers or pins arranged to make contact with the shafts and with the beam or rod and one of said feelers or pins being adjustable with respect to the beam or rod, and means for indicating and recording the amount of deviation of the two shafts from the coplanar condition.

5. An instrument for indicating the deviation from a coplanar condition of two substantially parallel shafts comprising a beam provided with intermediate pivot contact means and end contact means, the intermediate pivot contact means being arranged to abut against a fixed point adjacent the shafts under test whilst the two end contact means are arranged to respectively engage said shafts at points on lines inclined to the axes of the shafts, at least one of said pivot contact means being adjustable.

6. An instrument for indicating the coplanar condition of two members comprising a beam, intermediate pivot means for said beam, gauge pins for contacting with said members, one end of the beam being weighted to normally bear on the end of one of said pins when the parts are relatively positioned, adjustable means carried by the other end of the beam for contacting with the other pin, and an indicating device associated with said adjustable means.

7. An instrument for indicating the coplanar condition of two members comprising a supporting beam, a pivot element carried by the supporting beam at an intermediate point, means for adjustably supporting the ends of the supporting beam, a second beam having an intermediate seat cooperating with the pivot element, elements for contacting with the members, one element contacting with an end portion of the second beam, an adjustable contact device carried by the other end of the second beam for contacting with the other element, and an indicating device operated by the adjustable contact device.

8. In a device for determining the deviation from a coplanar relation of two substantially parallel shafts, means affording a fixed bearing point adjacent said shafts and a measuring device arranged to measure the respective distances from at least two points lying in an element of one shaft to a plane determined by said fixed point and by an element of the other shaft.

In testimony whereof, I have hereunto subscribed my name this 18th day of December 1920.

WILLIAM ECCLES.